United States Patent [19]

Wong et al.

[11] Patent Number: 4,577,335
[45] Date of Patent: Mar. 18, 1986

[54] COHERENT DATA COMMUNICATIONS TECHNIQUE

[75] Inventors: Hee Wong, San Jose; Carson Chen, San Bruno, both of Calif.

[73] Assignee: National Semiconductor Corporation, Santa Clara, Calif.

[21] Appl. No.: 569,358

[22] Filed: Jan. 9, 1984

[51] Int. Cl.$^4$ ............................................. H03D 3/22
[52] U.S. Cl. .................................... 375/86; 329/100; 329/112
[58] Field of Search .......................... 375/83, 86, 96; 329/100, 110, 126, 112; 340/825.58; 307/510, 518; 364/554, 575, 572

[56] References Cited

U.S. PATENT DOCUMENTS

| 3,047,660 | 7/1962 | Costas | 375/83 |
| 3,783,385 | 1/1974 | Dunn et al. | 375/83 |
| 4,302,845 | 11/1981 | McClaughry et al. | 375/83 |
| 4,457,005 | 6/1984 | Burke et al. | 375/83 |

Primary Examiner—Benedict V. Safourek
Assistant Examiner—Stephen Chin
Attorney, Agent, or Firm—Michael J. Pollock; Paul J. Winters; Gail W. Woodward

[57] ABSTRACT

A technique for communicating digital data through a noisy medium using phase modulated carrier signals. A multiphase clock drives parallel channels to sample the received signal, avoiding the need for a phase locked loop. Data is recovered from the noisy carrier by a two stage statistical filtering technique and pattern analysis of the filtered signals.

13 Claims, 13 Drawing Figures

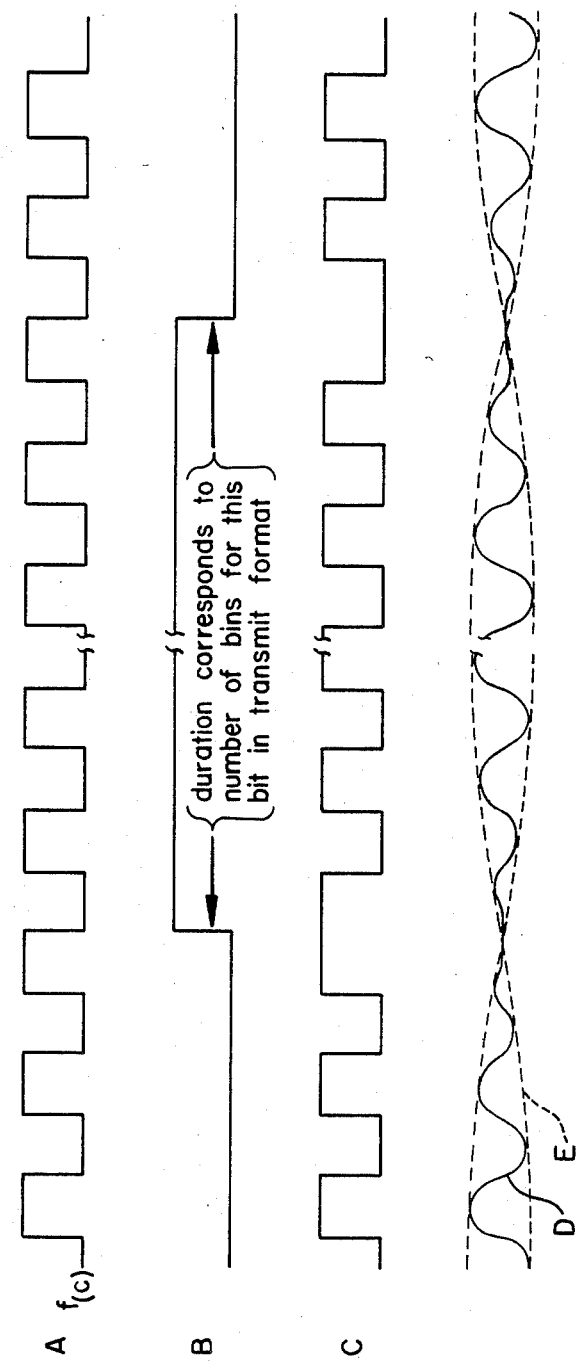

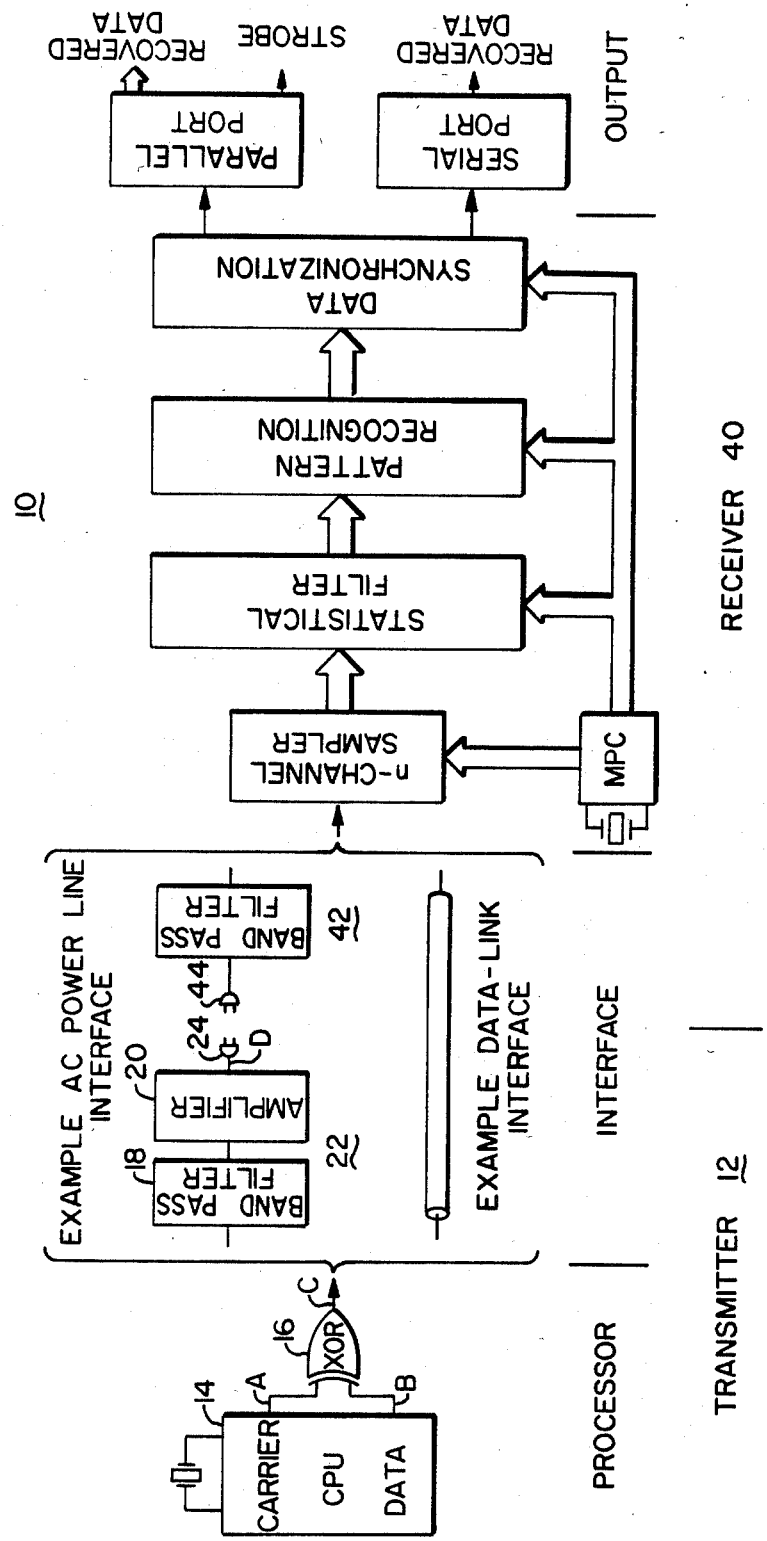
FIG._2.

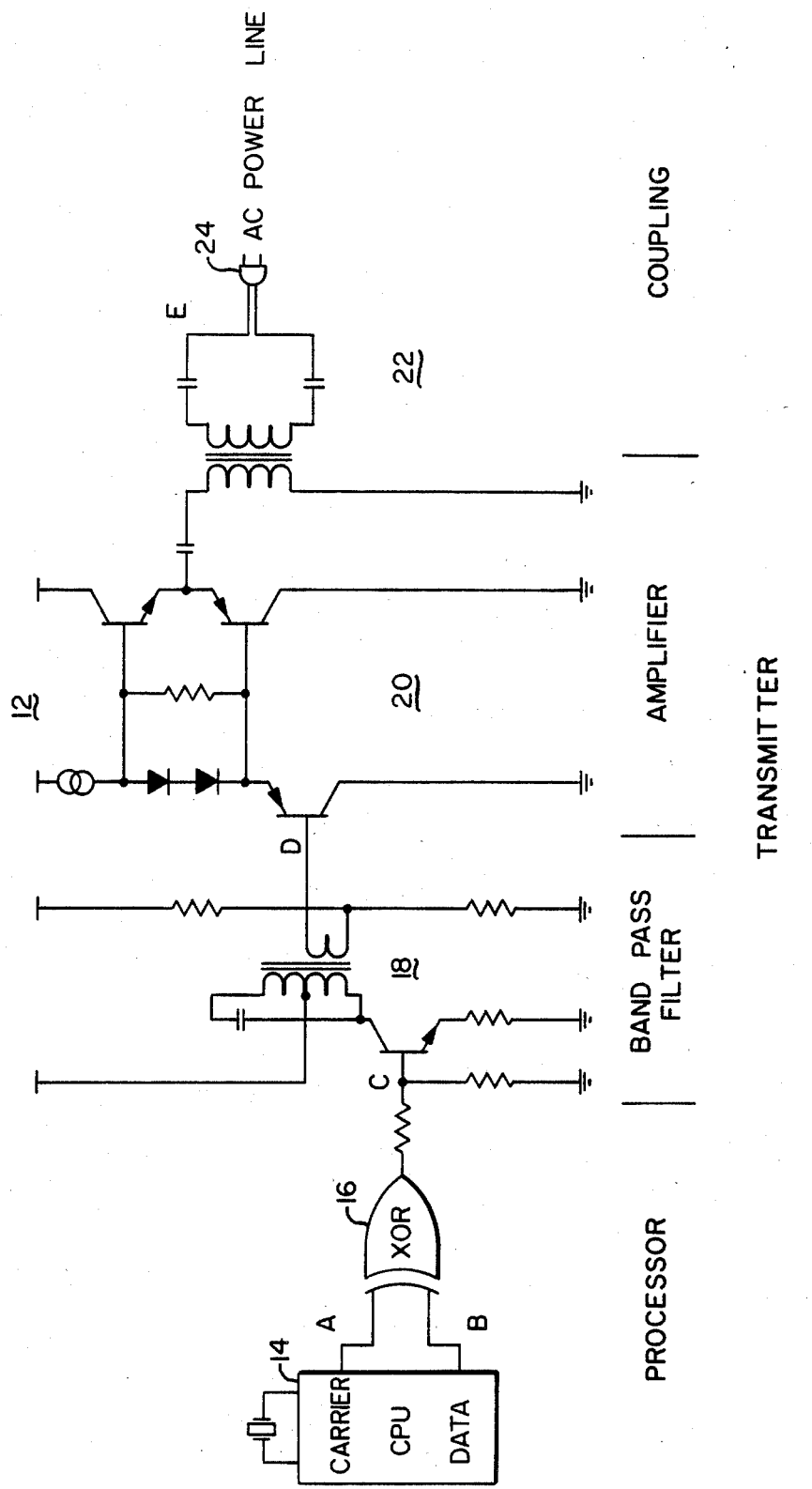
FIG._3.

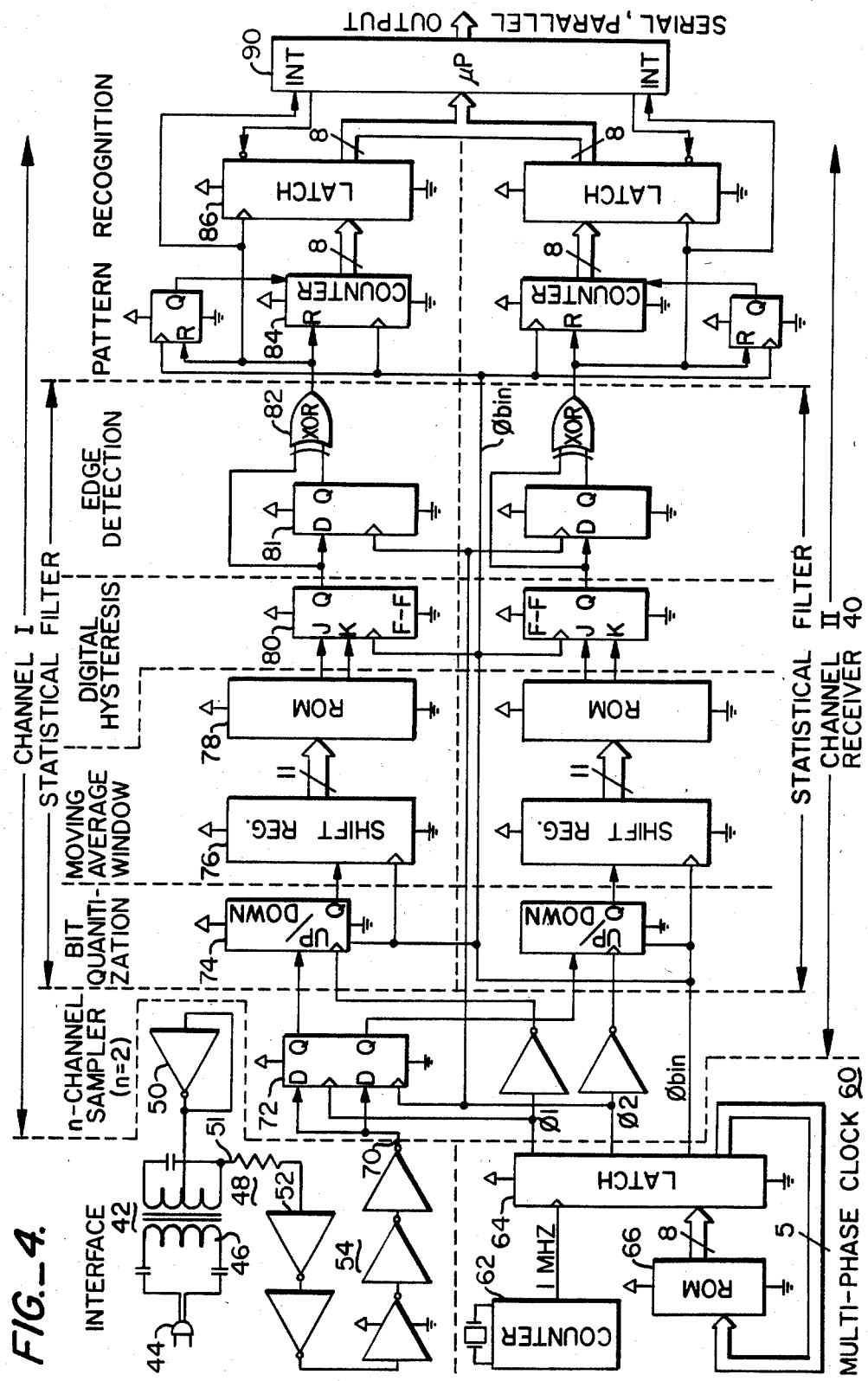
FIG._4.

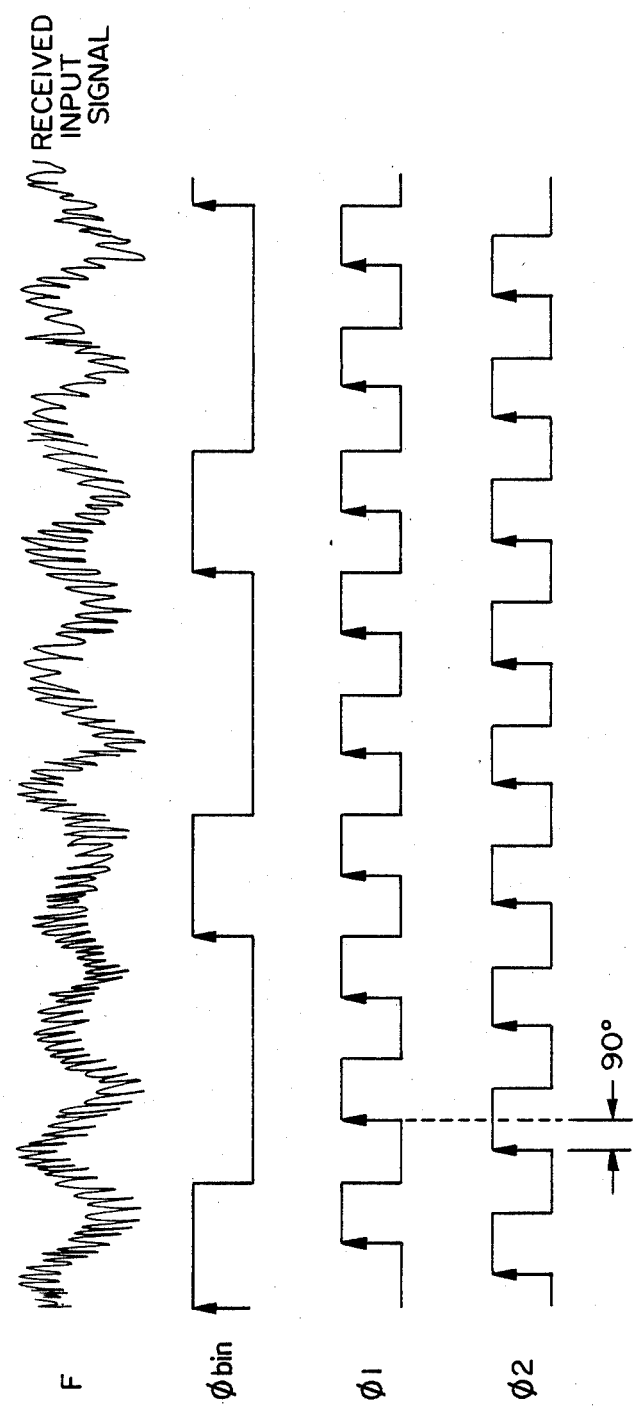
FIG._5.

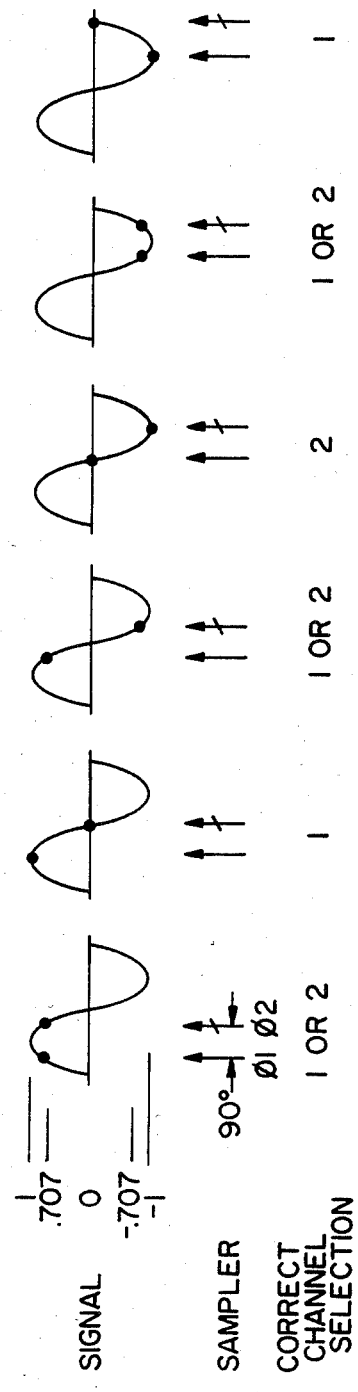
FIG._6.
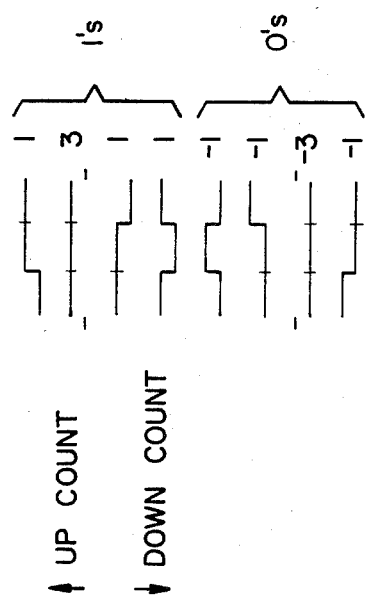
FIG._7B.
FIG._7A.

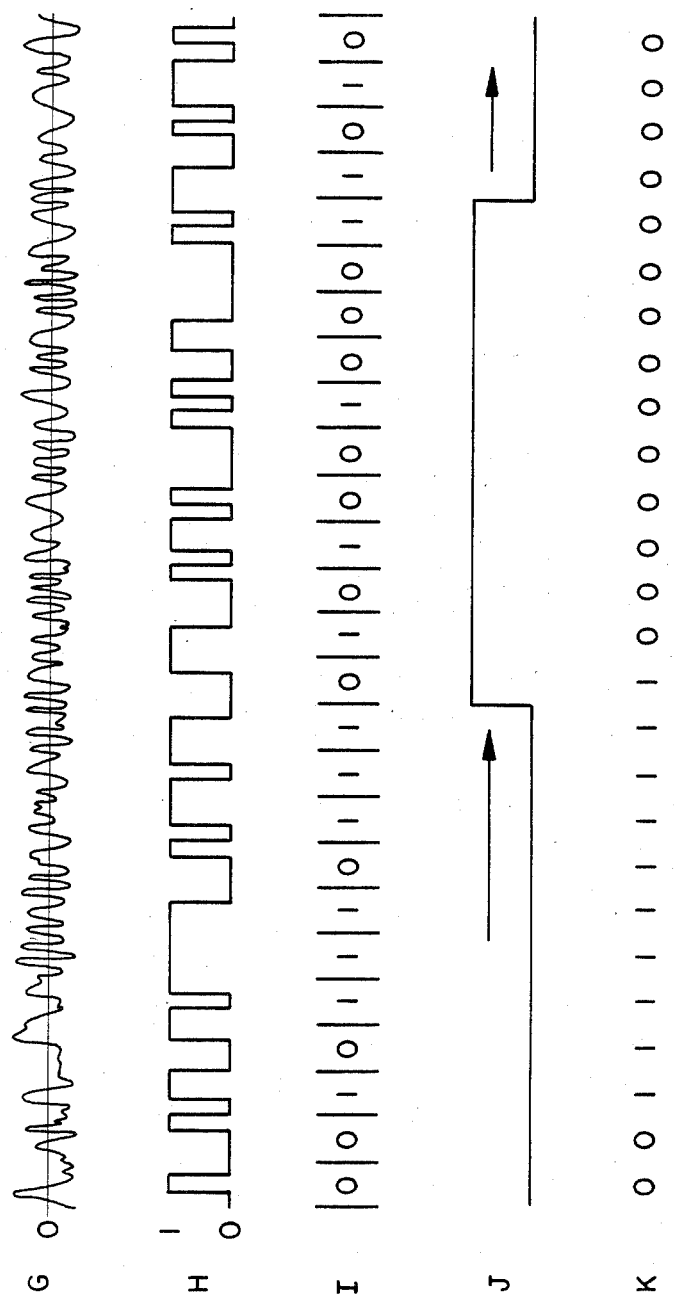
FIG._8.

| TRANSMIT FORMAT ||
|---|---|
| TRANSMIT DATA TYPE | NUMBER OF BINS TRANSMITTED |
| 1 | 15 BINS OF INFORMATION |
| 0 | 38 BINS OF INFORMATION |
| START/STOP | 61 BINS OF INFORMATION |

TRANSMITTER

*FIG._9A.*

| RECEIVED DATA TYPE | RECEIVED BIN COUNT CLUSTERING | | |
|---|---|---|---|
| | MIN | TYP | MAX |
| 1 | 4 | 15 | 26 |
| 0 | 27 | 38 | 49 |
| START/STOP | 50 | 342 – 8 BIT LENGTH | 210 |
| 8-BIT CHARACTER PLUS START/STOP LENGTH | 331 | 342 | 353 |

RECEIVER / DETECTOR

*FIG._9B.*

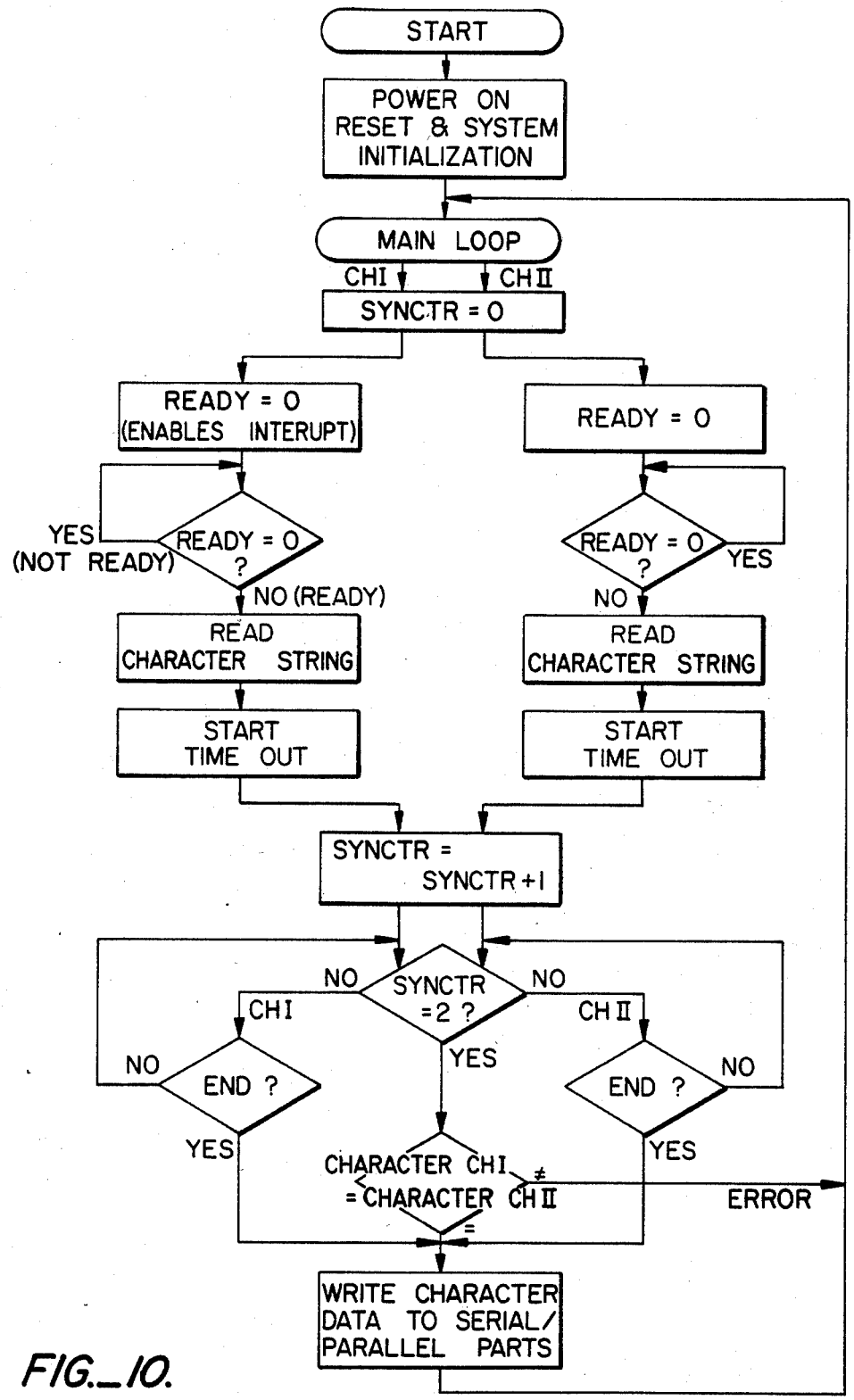
FIG._10.

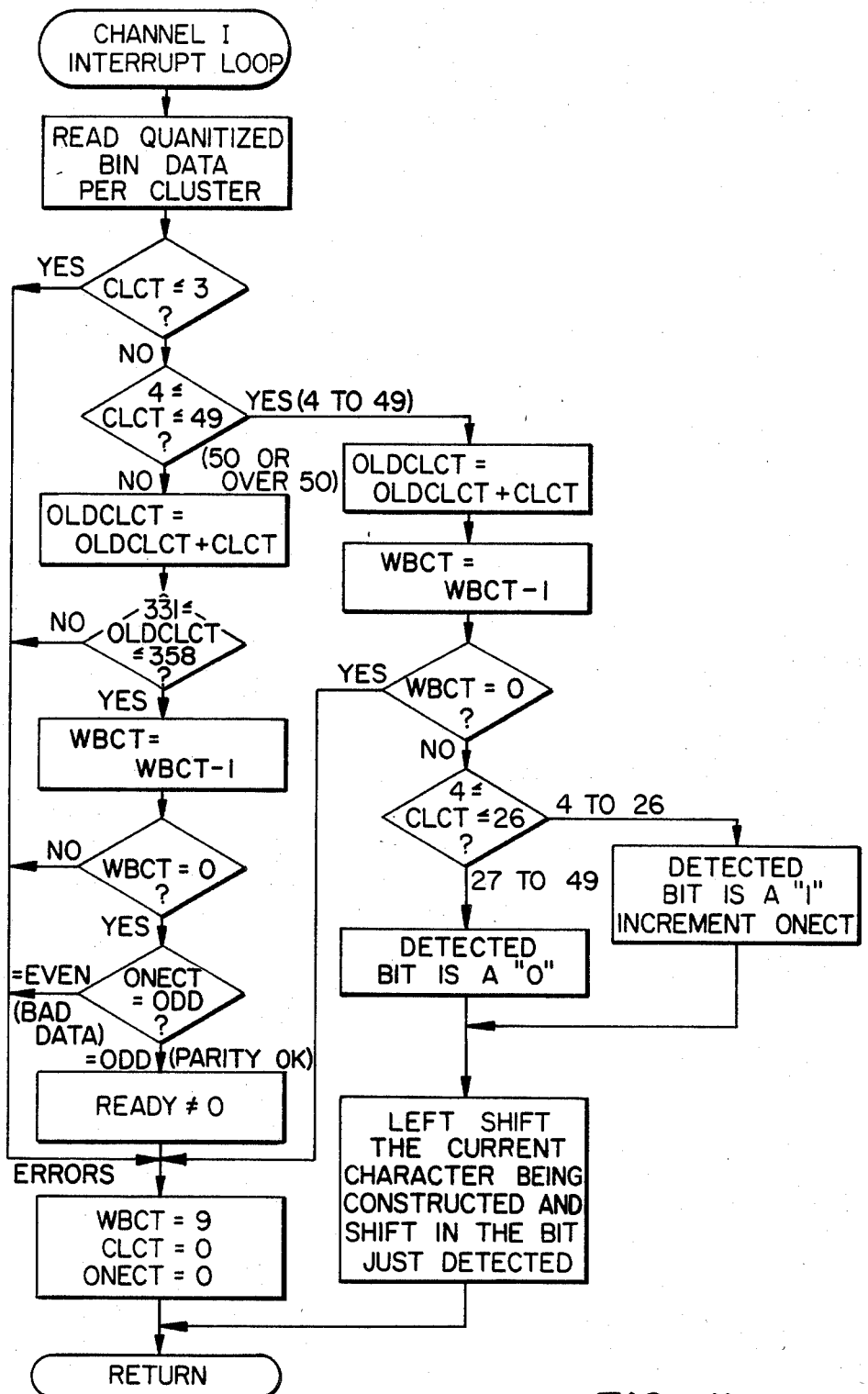
FIG._11.

4,577,335

COHERENT DATA COMMUNICATIONS TECHNIQUE

BACKGROUND OF THE INVENTION

1. Field of the Invention

This invention relates to digital data communication, and in particular to a technique for coherently demodulating asynchronous phase modulated carrier signals transmitted through a noisy medium.

2. Prior Art

"Base band" (high and low or "non-return-to-zero") digital data signals may be communicated through a medium such as an AC power line by providing a carrier wave in the range of 100 kHz to 400 kHz, modulating the carrier with the data signals, and adding the modulated carrier to the transmission medium. Carriers have been modulated in various ways. Amplitude and frequency modulation (AM and FM) are common because they are relatively simple, but they have the drawbacks of high error rates and wide bandwidths. These drawbacks are minimized by phase modulation (PM), also known as phase shift keying (PSK).

Referring to FIG. 1, a carrier signal A may be phase modulated by combining the carrier signal and a base band data signal B through an exclusive OR (XOR) gate. At each transition in the data signals, the gate phase-shifts the carrier signal 180° to produce a PSK modulated signal C. A phase shift indicates a transition between data bit values, but does not indicate the bit values themselves. The bit values are indicated by the length of time between transitions. For example, a high level data bit can be indicated by a short (high or low) signal, and a low level data bit by a long (high or low) signal. A receiver measures the time between carrier phase shifts to reconstruct the original data. Phase modulation is a conventional technique, but up until the present invention, it has required such elaborate circuitry for modulation and demodulation that it has not been economical. There remains a need for a better technique to communicate digital data signals in the presence of heavy noise, particularly random, spurious, and impulse type noises.

SUMMARY OF THE INVENTION

The present invention is an economical technique for narrow band-communication of digital data by phase modulation. In the invention, a receiver employs parallel channels driven by a multiphase clock to sample data, avoiding the need for a complex analog phase locked loop. A novel two-stage statistical filtering technique compresses sample values, finds their moving average, and applies hysteresis to resolve correct information, even using a very noisy carrier signal. A processor uses a pattern recognition algorithm to reconstruct the transmitted data. The invention is preferably implemented in integrated circuit form and thus is highly reliable over time and relatively immune to temperature effects.

BRIEF DESCRIPTION OF THE DRAWINGS

FIG. 1 is a timing diagram showing a clock signal (A) which is combined with a data signal (B) to produce a PSK signal (C), and the bandlimited PSK signal (D) outlined by envelope (E);

FIG. 2 is a block diagram of the transmitter and receiver;

FIG. 3 is a schematic of the transmitter;

FIG. 4 is a schematic of the receiver;

FIG. 5 is a timing diagram showing the relationship between the received noisy carrier signal (F), the sampling clocks $\phi 1$ and $\phi 2$, and the bin clock $\phi bin$;

FIG. 6 shows how at least one of the two sample clocks offset by 90° will take samples in a maximum amplitude quadrant of the carrier signal;

FIGS. 7a and 7b show how three samples are counted to give one bin value;

FIG. 8 is a timing diagram showing the relationships of the received noisy data (G) signal to the samples (H), the samples to the bin values (I), and the bin values to the moving average window (J) of bin values (K);

FIG. 9A is a table of the transmit format expected by the pattern recognition, algorithm;

FIG. 9B shows the upper and lower statistical bounds of each received bit type.

FIG. 10 is a flow chart of the main routine by which the processor recognizes received characters; and FIG. 11 is a flow chart of the subroutine by which the processor recognizes individual data bits and collects the bits to form characters.

DETAILED DESCRIPTION OF THE PREFERRED EMBODIMENT

Referring to FIG. 1, carrier signals A may be phase-shift modulated at predetermined time intervals to communicate information signals B. The main function of the present invention 10 is to recover a modulated carrier C and data signals B from a transmission medium with overwhelming spurious and random noise. The receiver of the present invention may be used for data which has been phase modulated and transmitted by any of several conventional multi-phase encoding techniques where the number n of phases is at least 2. Data bits are encoded as signals of several different lengths according to a format determined by the designer who (1) selects transmit timing formats for "1", "0", and start/stop bits (in this example, high level data bits are represented by short duration signals, and low level data bits are represented by long duration signals);

(2) determines the statistical variance of the "1", "0" and start/stop bit probability density functions; and (3) adjusts the transmit format so that the probability density functions of the transmitted/received data types are non-overlapping statistical domains.

FIG. 2 illustrates the invention with an improved and preferred transmitter circuit 12 suitable for two-phase transmission. Processor 14 generates a square wave carrier signal A and a digital data signal B, which are combined by XOR gate 16 to produce a PSK signal C as in FIG. 1. The PSK signal is then conditioned by an interface for the type of medium through which it is to be transmitted. Examples of transmission media include a coaxial cable data-link, an AC power line, and other well known media.

FIG. 3 details a transmitter preferred for use with carrier-current transmission medium. Signal C is bandlimited by an L-C bandpass filter 18, which smooths the square wave C into a sine wave D having reduced amplitude in the vicinity of phase shifts as outlined by envelope E. Typically, bandpass filter 18 will have a "Q" high enough to pass a relatively narrow bandwidth, reduce the carrier's high order harmonic components, and avoid causing sideband interference with radio frequency signals.

After filter 18, the smoothed PSK signal D is amplified by amplifier 20 to an appropriate level for transmission through a medium, such as an AC power line (not shown) connected at terminal 24 which may be an ordinary plug. A transformer 22 couples signal D to the power line for safety, but otherwise does not affect signal D.

PSK signals received from the transmission medium are first conditioned by an interface as necessary, then processed to recover the original data signals. The preferred embodiment of the receiver 40 in FIG. 4 has an interface 42 to tap signals from the transmission line, through, for example, an ordinary plug 44. The plug is connected in series to the ends of a coil 46 making up half of a coupling transformer 48. Transformer 48 is a high Q bandpass filter tuned to remove whatever frequencies predominate in the transmission medium, say 50 Hz, 60 Hz, and out-of-band noise, and to pass the carrier frequency. An inverted feedback amplifier 50 sets the transformer output signal 51 level to the threshold of amplifier 52. Transformer 48 produces, at its output line 51, a noisy analog waveform F as in FIG. 5. The analog signal F is squared up by a series of inverting amplifiers 54.

Waveform F is then sampled and filtered to reconstruct the transmitted data stream B. A multi-phase clock (MPC) generator 60 produces n sampling clock signals $\phi1, \phi2, \ldots \phi n$ at the carrier clock signal A frequency fc $\pm$ an error of less than one quarter of a clock period during the number of clock cycles required for a character to be transmitted. In this example, a character requires up to 353 "bins", with 3 cycles per bin, giving a clock error tolerance of $\pm 1/(353*4)$. The n clock phases are offset from each other by $360°/2n$. The number of sampling clock phases used is equal to the number of phases, n, of the PSK signal C. There are two reasons for using a multi-phase sampling clock.

First, a mismatch between independent transmitter and receiver clocks destroys good data. Multi-phase-clocks and duplicate channels operating in parallel solve this problem. If one of n sampling clocks samples in a minimum amplitude quadrant of the carrier signal, at least one other sampling clock phase offset by $360°/2n$ samples in a maximum amplitude quadrant.

Second, with a MPC there is a higher probability of receiving valid information in the presence of random noise. In conventional systems some lower limit or threshold, for example zero dB s/n, must be established to evaluate the received information. Information below the threshold is typically lost. In contrast, the present invention uses multi-phase-clocks which increase the probability of detecting correct signals in a poor signal-to-noise ratio environment.

In the example of two phase modulation, the MPC 60 generates two sampling clocks $\phi1$ and $\phi2$ with a phase difference of 90°, and a bin clock $\phi$bin at one-third the sample clock frequency. FIG. 6 shows how sampling a sine wave, like the smoothed PSK signal, twice per period with the sample clock periods offset 90° insures that at least one of the samples will fall during the two quadrants of positive and negative maximum amplitude, 45° to 115° and 225° to 315°. The signal is sampled at 70.7% or more of its maximum cycle amplitude point for whatever actual signal levels are received. If for example the incoming signal has deteriorated to 10% of its maximum transmitted amplitude, one of the MPCs will sample at the 70.7% or greater level of the 10% signal.

Referring again to FIG. 4, MPC 60 uses a crystal, appropriate connections, and a counter 62, preferably a type HC161, to divide the crystal frequency down to a 1 MHz reference frequency. A latch 64, preferably a type C374, and a ROM 66, preferably a type S288, divide the reference frequency into the two sample clock signals $\phi1$ and $\phi2$ at the same frequency but offset from each other by 90°, and a bin clock $\phi$bin, FIG. 5, at one-third their frequency.

The received signal F is processed by parallel channels I and II, which are identical except for being driven by the offset sample clocks. For clarity's sake, only one of the channels will be described. Even though at least one of the samples in each MPC cycle is sure to be in a maximum amplitude quadrant, the carrier signal is generally dominated by clicking, spurious, impulse, and random noise, which the MPC cannot eliminate. All of the samples are liable to include a noise component several times larger than the data component. A two stage statistical filter was developed to contend with the noise problem.

In the first filtering stage, bit quantization, the signal at amplifier output terminal 70 is applied to the D input of a flip-flop 72, preferably type 4013. The flip-flop samples the data signal G (FIG. 2) and produces a string of samples H. Three consecutive values H are applied to an up-down counter 74 to arrive at a "bin" value I. On every third sample clock signal, bin clock $\phi$bin resets up/down counter 74 to zero. The up/down counters may be type 4516. The designer may modify the number of samples-per-bin to accommodate more degrees-of-freedom than specified by the Central Limit Theorem and chi-square statistics. Quantizing three samples of data H into one bin value I provides hardware simplicity, a compression of three samples of information into one, and a more accurate statistical representation of the noise infested signal G than a 50/50 decision on one or two samples. FIG. 7a shows the eight possible sequences of three samples-input to up/down counter 74.

A "one" sample counts as a positive one, and a "zero" sample counts as a negative one. The sign of the sum gives the bin value. Referring to FIG. 7b, a zero MSB indicates a positive sum, and a bin value of 1; a one MSB indicates a negative sum, and a zero bin value. The final quantized decision level is based upon a ⅔ or greater occurrence of either logic level. Alternate decision levels and quantizations could be used instead at the designer's discretion. A four sample quantization would produce 2/4 bounds, and a five sample quantization would provide 3/5 bounds.

As shown in the FIG. 9 table, the number of bins transmitted is indicated by the timing between phase shifts, and the timing between phase shifts indicates the original bit values. Phase shifts are transitions of bin values from 1 to 0, or 0 to 1, depending on where the clocks $\phi1$ and $\phi2$ happen to be sampling relative to the period of carrier signal A. Noise considerations aside, if the two channels sample on opposite sides of the carrier signal zero crossings, then the two channel's bin values will be opposite.

The second stage of statistical filtering simulates the Central Limit Theorem by finding the moving average of a number of bins "N" according to the formula $$\frac{1}{N} \sum_{n=1}^{N} x_n$$

where "x" is the value "1" or "0" in bin number "n". The designer specifies a statistical outcome to determine the number of bins, eleven in the preferred embodiment, in the moving average window J (FIG. 8). Many of the transitions between bin values I are random and are caused by noise rather than carrier phase changes. The eleven bin moving average technique suppresses or damps these random transitions to produce the string of bin values K. The moving average is found by a shift register and a ROM or a PROM 78, preferably a type DM87S185. The $\phi$bin signal also clocks the bin value at the Q output terminal of up/down counter 74 into an eleven bit shift register 76. The register shifts in each new bin value I, and shifts out the eleventh oldest bit. Shift register 76 may be constructed using two type C164 eight bit shift registers, both incremented by the same $\phi$bin pulse, and the discards from one register being used as the input to the other register. The PROM code for providing the moving average is listed in Appendix A.

In many situations the statistical degrees-of-freedom required may make the moving average technique costly to implement and so impractical that it would never approach its theoretical accuracy. A practical solution is to incorporate into the second stage of filtering a digital hysteresis with thresholds set at a small percentage of the statistical variance of the samples due to noise. The digital hysteresis logic for the carrier current embodiment is implemented by having PROM 78 output a binary "01" when 7 or more bin values are low, and a binary "10" when 7 or more bin values are high. In between, when there is a difference of 3 or less in the count of high and low bin values, PROM 78 outputs a "00". These values are applied to the input terminals of a JK flip-flop 80, preferably type 4027. With unlike input signals, the flip-flop follows the value at the J input terminal. With zeroes at both terminals, the flip-flop retains its previous state. J-K flip-flop 80 delays switching from one value to the other value for the eleven bin binary average until more than 6 bins have the new value. Thus the received signal is recovered substantially free of random noise contamination or signal ambiguity.

The next portion of the receiver circuit performs edge detection. The Q output signal of JK flip-flop 80 is applied to both input terminals of XOR gate 82. One of the Q output signals is passed through a DQ flip-flop 81 before being applied to the XOR gate. When the output of JK flip-flop 80 changes, the signal applied directly to XOR gate 82 will arrive slightly before the signal applied indirectly, so the XOR inputs will momentarily be unlike, and the gate 82 output will be high until the second signal arrives. Phase transitions or edges are well preserved by this statistical filtering.

Once a phase transition has been detected, pattern recognition is applied to bin cluster counts to determine whether the received bit is a "0", a "1", or a start/stop. FIGS. 9a shows the selected number of information bins transmitted for each bit type used in the carrier current example, and FIG. 9b shows the upper and lower statistical bounds of each received bit type. This example uses seven data bits and an eighth odd parity bit.

Pattern recognition determines the time interval, or number of bins, between a change in bin values K, and thus between phase shifts in the data modulated carrier signal C. The signal from the edge detection XOR gate 82 is applied to the reset terminal of a counter 84, preferably a type 4520. Bin clock $\phi$bin increments the counter. Reset signals are also applied to a latch 86, preferably a type C374, to latch the count.

The bin counts approximate the time intervals between carrier phase shifts in the transmission. The pattern recognition algorithms in the FIG. 9 and 10 flowcharts analyze the count of bins to reconstruct the transmitted data string. The bin count analysis may be done on any suitable microprocessor, such as an INS 8070 using the program in Appendix B. For an alternate embodiment of the PSK system with n>2 phases the algorithms should be expanded.

The microprocessor 90 first initializes counters for several variables used in analyzing the bin counts. "CLCT" is a "cluster count" of the number of bins as received from latch 86; "OLDCLCT" is the old cluster count; "WBCT" is the "word" bit count; "ONECT" is the number of "1"s counted in a word; and "SYNCTR" is the number of channels that have analyzed a complete word of bits. The values for these variables depend upon the choice of communication format (number of bits-per-word and use of start-stop bits) and transmission format (number of bins to represent a "1", a "0", and a "start-stop"). The FIG. 10 flowchart is for the transmit format shown in FIGS. 9a and 9b. The variables CLCT, OLDCLCT, and ONECT are each initialized to zero and WBCT is initialized to nine.

Microprocessor 90 sets a "ready" flag to false (0) for each channel, and waits for an interrupt signal from either channel. The same XOR gate 82 signal that latches latch 86 and resets counter 84 also interrupts microprocessor 90 to notify it that a count is ready to be analyzed.

The duplicate sampling channels I and II both interrupt microprocessor 90, which executes a routine for each channel. Suppose that channel I is the first to complete a bin count in latch 86 and to send an interrupt signal to microprocessor 90. The microprocessor begins executing the routine in the FIG. 10 flowchart to analyze the cluster counts from latch 86. It finds errors and reinitializes the counters until it has recognized a correct number of bins and bits for a word, and then sets the "ready" flag to true (1). When the ready flag is set to true, the microprocessor routine in the FIG. 9 flowchart for that channel exits the waiting-for-ready loop, increments the SYNCTR counter, and waits a predetermined length of time for the other channel to successfully analyze a word, set its ready flag to true, and increment the SYNCTR counter. The START and END CHARACTER TIME OUT sequence near the end of the FIG. 10 flowchart is to prevent waiting indefinitely to receive data from a dead channel. The possibility of a dead or information-less channel is a function of the beating associated with transmitting and receiving data with asynchronous clocks. When the SYNCTR count equals 2, or when the length of time during which the other channel could recognize the same character has passed, microprocessor 90 goes on to "write" the recognized character to another device, not shown. The preferred embodiment of the invention, operating with a noisy 0 dB s/n power transmission line, successfully recognizes a character on one channel or the other about 4/5 of the time; on both channels about 1/5 of the time, and infrequently makes the mistake of "recognizing" two different characters. After a character is written, the processor resets the counters and ready flags as explained, and waits for another interrupt.

Meanwhile, counter 84 will have been accumulating a bin count for the next data bit transmitted.

Details have been disclosed to illustrate the invention in a preferred embodiment of which adaptations and modifications within the spirit and scope of the invention will occur to those skilled in the art. The scope of the invention is limited only by the following claims.

APPENDIX A

```
1000 REM CCD CARRIER CURRENT DETECTOR - FILTER ROM
1010 DEFINT O,L,M,N,S: DIM O(2047)
1020   FOR L=0 TO 2047: O(L)=0: NEXT
1030   FOR L=0 TO 2047: M=&H400: S=0
1040     FOR N=1 TO 11: IF (L AND M) > 0 THEN S=S+1
1050       M=M\2
1060     NEXT
1070     IF S<5 THEN O(L)=1
1080     IF S>6 THEN O(L)=2
1090   PRINT L: NEXT
1140 OPEN "O",#1,"B.FROM"
1150   FOR L=0 TO 2047: PRINT #1,CHR$(O(L)): NEXT
1160 CLOSE: END
```

XDUMP

CP/M DUMP UTILITY

```
0000RD01 01 01 01 01 01 01 01  01 01 01 01 01 01 01 01   ........ ........
0010 01 01 01 01 01 01 01 01   01 01 01 01 01 01 01 00   ........ ........
0020 01 01 01 01 01 01 01 01   01 01 01 01 01 01 01 00   ........ ........
0030 01 01 01 01 01 01 01 00   01 01 01 00 01 00 00 00   ........ ........
0040 01 01 01 01 01 01 01 01   01 01 01 01 01 01 01 00   ........ ........
0050 01 01 01 01 01 01 01 00   01 01 01 00 01 00 00 00   ........ ........
0060 01 01 01 01 01 01 01 00   01 01 01 00 01 00 00 00   ........ ........
0070 01 01 01 00 01 00 00 00   01 00 00 00 00 00 00 02   ........ ........
0080 01 01 01 01 01 01 01 01   01 01 01 01 01 01 01 00   ........ ........
0090 01 01 01 01 01 01 01 00   01 01 01 00 01 00 00 00   ........ ........
00A0 01 01 01 01 01 01 01 00   01 01 01 00 01 00 00 00   ........ ........
00B0 01 01 01 00 01 00 00 00   01 00 00 00 00 00 00 02   ........ ........
00C0 01 01 01 01 01 01 01 00   01 01 01 00 01 00 00 00   ........ ........
00D0 01 01 01 00 01 00 00 00   01 00 00 00 00 00 00 02   ........ ........
00E0 01 01 01 00 01 00 00 00   01 00 00 00 00 00 00 02   ........ ........
00F0 01 00 00 00 00 00 00 02   00 00 00 02 00 02 02 02   ........ ........
0100 01 01 01 01 01 01 01 01   01 01 01 01 01 01 01 00   ........ ........
0110 01 01 01 01 01 01 01 00   01 01 01 00 01 00 00 00   ........ ........
0120 01 01 01 01 01 01 01 00   01 01 01 00 01 00 00 00   ........ ........
0130 01 01 01 00 01 00 00 00   01 00 00 00 00 00 00 02   ........ ........
0140 01 01 01 01 01 01 01 00   01 01 01 00 01 00 00 00   ........ ........
0150 01 01 01 00 01 00 00 00   01 00 00 00 00 00 00 02   ........ ........
0160 01 01 01 00 01 00 00 00   01 00 00 00 00 00 00 02   ........ ........
0170 01 00 00 00 00 00 00 02   00 00 00 02 00 02 02 02   ........ ........
0180 01 01 01 01 01 01 01 00   01 01 01 00 01 00 00 00   ........ ........
0190 01 01 01 00 01 00 00 00   01 00 00 00 00 00 00 02   ........ ........
01A0 01 01 01 00 01 00 00 00   01 00 00 00 00 00 00 02   ........ ........
01B0 01 00 00 00 00 00 00 02   00 00 00 02 00 02 02 02   ........ ........
01C0 01 01 01 00 01 00 00 00   01 00 00 00 00 00 00 02   ........ ........
01D0 01 00 00 00 00 00 00 02   00 00 00 02 00 02 02 02   ........ ........
01E0 01 00 00 00 00 00 00 02   00 00 00 02 00 02 02 02   ........ ........
01F0 00 00 00 02 00 02 02 02   00 02 02 02 02 02 02 02   ........ ........
```

```
0200  01 01 01 01 01 01 01 01   01 01 01 01 01 01 01 00    ........ ........
0210  01 01 01 01 01 01 01 00   01 01 01 00 01 00 00 00    ........ ........
0220  01 01 01 01 01 01 01 00   01 01 01 00 01 00 00 00    ........ ........
0230  01 01 01 00 01 00 00 00   01 00 00 00 00 00 00 02    ........ ........
0240  01 01 01 01 01 01 01 00   01 01 01 00 01 00 00 00    ........ ........
0250  01 01 01 00 01 00 00 00   01 00 00 00 00 00 00 02    ........ ........
0260  01 01 01 00 01 00 00 00   01 00 00 00 00 00 00 02    ........ ........
0270  01 00 00 00 00 00 00 02   00 00 00 02 00 02 02 02    ........ ........
0280  01 01 01 01 01 01 01 00   01 01 01 00 01 00 00 00    ........ ........
0290  01 01 01 00 01 00 00 00   01 00 00 00 00 00 00 02    ........ ........
02A0  01 01 01 00 01 00 00 00   01 00 00 00 00 00 00 02    ........ ........
02B0  01 00 00 00 00 00 00 02   00 00 00 02 00 02 02 02    ........ ........
02C0  01 01 01 00 01 00 00 00   01 00 00 00 00 00 00 02    ........ ........
02D0  01 00 00 00 00 00 00 02   00 00 00 02 00 02 02 02    ........ ........
02E0  01 00 00 00 00 00 00 02   00 00 00 02 00 02 02 02    ........ ........
02F0  00 00 00 02 00 02 02 02   00 02 02 02 02 02 02 02    ........ ........
0300  01 01 01 01 01 01 01 00   01 01 01 00 01 00 00 00    ........ ........
0310  01 01 01 00 01 00 00 00   01 00 00 00 00 00 00 02    ........ ........
0320  01 01 01 00 01 00 00 00   01 00 00 00 00 00 00 02    ........ ........
0330  01 00 00 00 00 00 00 02   00 00 00 02 00 02 02 02    ........ ........
0340  01 01 01 00 01 00 00 00   01 00 00 00 00 00 00 02    ........ ........
0350  01 00 00 00 00 00 00 02   00 00 00 02 00 02 02 02    ........ ........
0360  01 00 00 00 00 00 00 02   00 00 00 02 00 02 02 02    ........ ........
0370  00 00 00 02 00 02 02 02   00 02 02 02 02 02 02 02    ........ ........
0380  01 01 01 00 01 00 00 00   01 00 00 00 00 00 00 02    ........ ........
0390  01 00 00 00 00 00 00 02   00 00 00 02 00 02 02 02    ........ ........
03A0  01 00 00 00 00 00 00 02   00 00 00 02 00 02 02 02    ........ ........
03B0  00 00 00 02 00 02 02 02   00 02 02 02 02 02 02 02    ........ ........
03C0  01 00 00 00 00 00 00 02   00 00 00 02 00 02 02 02    ........ ........
03D0  00 00 00 02 00 02 02 02   00 02 02 02 02 02 02 02    ........ ........
03E0  00 00 00 02 00 02 02 02   00 02 02 02 02 02 02 02    ........ ........
03F0  00 02 02 02 02 02 02 02   02 02 02 02 02 02 02 02    ........ ........
0400  01 01 01 01 01 01 01 01   01 01 01 01 01 01 01 00    ........ ........
0410  01 01 01 01 01 01 01 00   01 01 01 00 01 00 00 00    ........ ........
0420  01 01 01 01 01 01 01 00   01 01 01 00 01 00 00 00    ........ ........
0430  01 01 01 00 01 00 00 00   01 00 00 00 00 00 00 02    ........ ........
0440  01 01 01 01 01 01 01 00   01 01 01 00 01 00 00 00    ........ ........
0450  01 01 01 00 01 00 00 00   01 00 00 00 00 00 00 02    ........ ........
0460  01 01 01 00 01 00 00 00   01 00 00 00 00 00 00 02    ........ ........
0470  01 00 00 00 00 00 00 02   00 00 00 02 00 02 02 02    ........ ........
0480  01 01 01 01 01 01 01 00   01 01 01 00 01 00 00 00    ........ ........
0490  01 01 01 00 01 00 00 00   01 00 00 00 00 00 00 02    ........ ........
04A0  01 01 01 00 01 00 00 00   01 00 00 00 00 00 00 02    ........ ........
04B0  01 00 00 00 00 00 00 02   00 00 00 02 00 02 02 02    ........ ........
04C0  01 01 01 00 01 00 00 00   01 00 00 00 00 00 00 02    ........ ........
04D0  01 00 00 00 00 00 00 02   00 00 00 02 00 02 02 02    ........ ........
04E0  01 00 00 00 00 00 00 02   00 00 00 02 00 02 02 02    ........ ........
04F0  00 00 00 02 00 02 02 02   00 02 02 02 02 02 02 02    ........ ........
```

APPENDIX B

```
8070 ASSEMBLER
CCT    CARRIER CURRENT DETECTOR

1                          .TITLE      'CARRIER CURRENT DETECTOR'
 2                   ;
 3                   ;8154 I/O    1000 - 1007    A BIT CLR OR RD
 4                   ;            1008 - 100F    B BIT CLR OR RD
 5                   ;            1010 - 1017    A BIT SET OR RD
 6                   ;            1018 - 101F    B BIT SET OR RD
 7                   ;            1020           A PORT PARA R/W
 8                   ;            1021           B PORT PARA R/W
 9                   ;            1022           A DEF
10                   ;            1023           B DEF
11                   ;            1024           MODE
12                   ;
13     0001   IE      =    1
14     0002   F1      =    2
15     0004   F2      =    4
16     0008   F3      =    8
17     0020   SBMSK   =    020
18            ;
19     FF88   STBS0   =    -01080+01008
20     FF98   STBR0   =    -01080+01018
21     FF89   STBS1   =    -01080+01009
22     FF99   STBR1   =    -01080+01019
23     FFA0   PRTA    =    -01080+01020
24     FFA1   PRTB    =    -01080+01021
25     FFA2   PRTADF  =    -01080+01022
26     FFA3   PRTBDF  =    -01080+01023
27     FFA4   MDE     =    -01080+01024
28     2000   ACE     =    02000
29     0000   CHA     =    0
30     0001   CHB     =    1
31     0010   SYNCTR  =    010
32     FF00   ADATA   =    0FF00
33     FF01   BDATA   =    0FF01
34            ;
35     FFC0   CHAR    =    0FFC0
36     FFC1   WDCNT   =    0FFC1
37     FFC2   RDY     =    0FFC2
38     FFC3   SUML    =    0FFC3
39     FFC4   SUMH    =    0FFC4
40     FFC5   CHRD    =    0FFC5
41     FFC6   ONECT   =    0FFC6
42     FFC7   TMR     =    0FFC7
43     FFC8   SEL     =    0FFC8
44            ;
45            ;
46                   .MACRO    JPRST
47                   BP        RESTT
48                   .ENDM
49            ;
50                   .MACRO    JZRST
51                   BZ        RESTT
52                   .ENDM
53            ;
54                   .MACRO    JNZRST
```

8070 ASSEMBLER
CCT     CARRIER CURRENT DETECTOR

```
 55                              BNZ      RESTT
 56                              .ENDM
 57                     ;
 58                              .MACRO   STB
 59                              ST       A,STBS1,P3
 60                              ST       A,STBR1,P3
 61                              .ENDM
 62                     ;
 63                              .MACRO   WRAM,X
 64                     LPA^X:   LD       EA,P2
 65                              ST       A,1,@P2
 66                              BNZ      LPA^X
 67                              .ENDM
 68                     ;
 69                              .MACRO   CZRAM,X
 70                     LPB^X:   LD       EA,P2
 71                              XOR      A,1,@P2
 72                              BNZ      START
 73                              ST       A,-1,P2
 74                              LD       EA,P2
 75                              BNZ      LPB^X
 76                              .ENDM
 77                     ;
 78                     ;
 79 0000                         .=0
 80 0000 00                      NOP
 81 0001 246900                  JMP      START
 82 0004                         .=4
 83 0004 7402                    BRA      INTA
 84 0006                         .=7
 85 0007 5C                      RET
 86                     ;
 87                     ;
 88                     ;
 89                     ;********** INTERRUPT A **********
 90 0008 08             INTA:    PUSH     EA              ;SAVE EA
 91 0009 840000                  LD       EA,=0
 92 000C C5C8                    LD       A,SEL
 93 000E 6C04                    BZ       BB3
 94 0010 C500                    LD       A,ADATA
 95 0012 7402                    BRA      BBMX3
 96 0014 C501          BB3:      LD       A,BDATA
 97 0016 09            BBMX3:    LD       T,EA
 98 0017 D4FC                    AND      A,=0FC
 99 0019                         JZRST                    ;0 TO 3 COUNTS, ERROR
100 001B 0B                      LD       EA,T
101 001C F4CE                    ADD      A,=256-50
102 001E 06                      LD       A,S
103 001F 642C                    BP       CHRB            ;DATA BIT, 4 TO 49
104                     ;
105                     ;START BIT
106 0021 0B            STRTB:    LD       EA,T            ;50 AND UP
107 0022 B5C3                    ADD      EA,SUML
108                     ;
109 0024 FC62                    SUB      A,=98
110 0026                         JPRST                    ;256+98 AND OVER
111 0028 F497                    ADD      A,=128+98-75
112 002A                         JPRST                    ;256+74 AND LESS
113                     ;
114 002C 9DC1                    DLD      A,WDCNT
```

8070 ASSEMBLER
CCT   CARRIER CURRENT DETECTOR

```
115 002E BC0001            SUB     EA,=0100        ;CHK WDCNT AND CHRSUM HIGH
116 0031 58                OR      A,E
117 0032                   JNZRST                  ;NOT 9TH ENTRY
118                ;
119 0034 C5C6              LD      A,ONECT
120 0036 3E                RR      A
121 0037                   JPRST                   ;EVEN, ERROR
122 0039 CDC2              ST      A,RDY           ;READY, NON ZERO
123                ;
124 003B C5C0              LD      A,CHAR
125 003D CDC5              ST      A,CHRD          ;O/P CHAR
126                ;
127                ;
128 003F 840009  RESTT:    LD      EA,=0900        ;E=9, A=0
129 0042 8DC0              ST      EA,CHAR         ;CHAR, WDCNT
130 0044 48                LD      E,A             ;A=0
131 0045 8DC3              ST      EA,SUML         ;RESET CHRSU 1
132 0047 CDC6              ST      A,ONECT
133 0049 3A                POP     EA
134 004A 3B01              OR      S,=IE
135 004C 5C                RET
136                ;
137                ;CHARACTER BIT
138 004D 0B      CHRB:     LD      EA,T            ;4 TO 49
139 004E B5C3              ADD     EA,SUML
140 0050 8DC3              ST      EA,SUML         ;UPDATE CHRSUM
141                ;
142 0052 9DC1              DLD     A,WDCNT
143 0054                   JZRST                   ; 9TH ENTRY, ERROR
144                ;
145 0056 0B                LD      EA,T
146 0057 FC1B              SUB     A,=27
147 0059 6405              BP      CHRO            ;4 TO 26,
148 005B 95C6              ILD     A,ONECT         ;27 TO 49
149 005D 840001            LD      EA,=0100
150 0060 C5C0    CHRO:     LD      A,CHAR
151 0062 0E                SL      A
152 0063 70                ADD     A,E
153 0064 CDC0              ST      A,CHAR          ;BUILD UP CHAR
154 0066 3A                POP     EA
155 0067 3B01              OR      S,=IE
156 0069 5C                RET
157                ;
158                ;
159                ;
160                ;
161                ;********** PROGRAM START ********
162 006A C40E   START:     LD      A,=F1+F2+F3
163 006C 07                LD      S,A
164 006D 26C0FF            LD      P2,=CHAR
165 0070                   WRAM    1
166 0075 26C0FF            LD      P2,=CHAR
167 0078                   CZRAM   1
168                ;
169 0082 250000            LD      SP,=0
170 0085 268110            LD      P2,=CHB+01080
171 0088 06                LD      A,S
172 0089 D420              AND     A,=SBMSK
173 008B CDC8              ST      A,SEL
```

8070 ASSEMBLER
CCT     CARRIER CURRENT DETECTOR

```
174 008D 6C35              BZ      INDNE
175                 ;
176 008F 268010            LD      P2,=CHA+01080
177 0092                   WRAM    2
178 0097 268010            LD      P2,=CHA+01080
179 009A                   CZRAM   2
180                 ;
181 00A4 270020            LD      P3,=ACE
182 00A7 C482              LD      A,=082
183 00A9 CB03              ST      A,3,P3          ;INIT ACE
184 00AB 843200            LD      EA,=50
185 00AE 8B00              ST      EA,0,P3         ;1200 BAUD
186 00B0 C402              LD      A,=2
187 00B2 CB03              ST      A,3,P3
188 00B4 C400              LD      A,=0
189 00B6 CB01              ST      A,1,P3
190                 ;
191 00B8 268010            LD      P2,=CHA+01080   ;INIT 8154
192 00BB CAA4              ST      A,MDE,P2
193 00BD 84FFFF            LD      EA,=0FFFF
194 00C0 8AA2              ST      EA,PRTADF,P2
195 00C2 8AA0              ST      EA,PRTA,P2
196                 ;
197 00C4 278010  INDNE:    LD      P3,=CHA+01080
198                 ;
199 00C7 C400    LPST:     LD      A,=0
200 00C9 CB10              ST      A,SYNCTR,P3
201 00CB CDC2              ST      A,RDY           ;SET NOT READY
202 00CD 3B01              OR      S,=IE
203                 ;
204 00CF C5C2    RDYLP:    LD      A,RDY
205 00D1 6CFC              BZ      RDYLP
206                 ;
207 00D3 C5C5              LD      A,CHRD
208 00D5 48                LD      E,A
209 00D6 CA00              ST      A,0,P2          ;CHA,CHB
210 00D8 C414              LD      A,=20           ;600 USEC TMR
211 00DA CDC7              ST      A,TMR
212                 ;
213 00DC 9310              ILD     A,SYNCTR,P3
214 00DE C310    SYNLP:    LD      A,SYNCTR,P3
215 00E0 E402              XOR     A,=2
216 00E2 6C23              BZ      TWOOK
217                 ;
218 00E4 9DC7              DLD     A,TMR
219 00E6 7CF6              BNZ     SYNLP
220 00E8 40      OPLP:     LD      A,E             ;CHAR
221 00E9 E4AB              XOR     A,=0AB
222 00EB 390E              AND     S,=F3+F2+F1
223 00ED 6C04              BZ      ROK
224 00EF                   STB
225 00F3 40      ROK:      LD      A,E
226 00F4 3C                SR      A
227 00F5 CB88              ST      A,STBSO,P3
228 00F7 270020            LD      P3,=ACE
229 00FA CB00              ST      A,0,P3          ;WR ACE
230 00FC 278010            LD      P3,=CHA+01080
231 00FF CBA0              ST      A,PRTA,P3       ;WR PARA PORT
232 0101 CB98              ST      A,STBRO,P3
233 0103 3B01              OR      S,=IE
```

8070 ASSEMBLER
CCT   CARRIER CURRENT DETECTOR

```
234 0105 74C0            BRA      LPST
235                ;
236 0107 C5C8    TWOOK:  LD       A, SEL
237 0109 7CBC            BNZ      LPST
238 010B 8300            LD       EA, CHA, P3
239 010D 60              XOR      A, E
240 010E 6C05            BZ       OPLP2
241 0110 60              XOR      A, E
242 0111 BB40            ST       EA, 040, P3
243 0113 74B2            BRA      LPST
244                ;
245 0115 40      OPLP2:  LD       A, E
246 0116 E4AB            XOR      A, =0AB
247 0118 390E            AND      S, =F3+F2+F1
248 011A 6C04            BZ       ROK2
249 011C                 STB
250 0120 40      ROK2:   LD       A, E
251 0121 3C              SR       A
252 0122 CB88            ST       A, STBS0, P3
253 0124 270020          LD       P3, =ACE
254 0127 CB00            ST       A, 0, P3         ; WR ACE
255 0129 278010          LD       P3, =CHA+01080
256 012C CBA0            ST       A, PRTA, P3      ; WR PARA PORT
257 012E CB98            ST       A, STBR0, P3
258 0130 3B01            OR       S, =IE
259 0132 7493            BRA      LPST
260      0000            .END
```

8070 ASSEMBLER
CCT   CARRIER CURRENT DETECTOR

```
ACE     2000       ADATA  FF00     BB3    0014     BBMX3  0016
BDATA   FF01       CHA    0000     CHAR   FFC0     CHB    0001
CHR0    0060       CHRB   004D     CHRD   FFC5     F1     0002
F2      0004       F3     0008     IE     0001     INDNE  00C4
INTA    0008       LPA1   0070     LPA2   0092     LPB1   0078
LPB2    009A       LPST   00C7     MDE    FFA4     ONECT  FFC6
OPLP    00E8  *    OPLP2  0115     PRTA   FFA0     PRTADF FFA2
PRTB    FFA1  *    PRTBDF FFA3 *   RDY    FFC2     RDYLP  00CF
RESTT   003F       ROK    00F3     ROK2   0120     SBMSK  0020
SEL     FFC8       START  006A     STBR0  FF98     STBR1  FF99
STBS0   FF88       STBS1  FF89     STRTB  0021 *   SUMH   FFC4  *
SUML    FFC3       SYNCTR 0010     SYNLP  00DE     TMR    FFC7
TWOOK   0107       WDCNT  FFC1
```

NO ERROR LINES
SOURCE CHECKSUM = 0FEB
OBJECT CHECKSUM = 0797
INPUT FILE    1:CCTDET.SRC ON INS
OBJECT FILE   1:CCTDET.LM ON INS

We claim:

1. A receiver for reconstructing data from a received phase modulated transmission comprising:
   a multiphase clock generator for generating n sample clock signals at the same frequency and phase offset from each other by 360°/2n, and for generating a bin clock signal at a frequency equal to the sample clock frequency divided by a first predetermined number;
   n channels, each connected to receive a respective sample clock signal and the phase modulated transmission and each including
   sampler means, responsive to said received phase modulated transmission, to take one sample of the received transmission in response to each sample clock signal and to provide high and low sample output signals for digitally driving each of said n channels as a function of the related clock signal;
   a statistical filter, responsive to said sample output signal; and including counter means responsive to said bin clock signal to produce an average bin value for the first predetermined number of consecutive samples; and moving average means responsive to said bin clock signal to form moving average values of a second predetermined number of consecutive bins; and
   pattern recognition means to assign data bit values to predetermined patterns of said moving average values.

2. A receiver as in claim 1 wherein said moving average means includes a shift register to which said sampler means output signals are provided as input, and which provides the second predetermined number of most recent samples as shift register output signals.

3. A receiver as in claim 2 wherein the moving average means includes a memory to which the register output signals are provided as address inputs, and which provides output signals indicative of the numbers of high and low samples in the address.

4. A receiver as in claim 3 wherein the statistical filter includes digital hysteresis means for damping changes in memory output signals.

5. A receiver as in claim 3 wherein the statistical filter includes phase transition detection means for producing a change signal in response to changes in memory output signals.

6. A receiver as in claim 5 wherein the pattern recognition means includes a second counter to count the number of bin clock signals between change signals.

7. A receiver as in claim 1 wherein n=2.

8. A receiver as in claim 1 wherein the first predetermined number is 3.

9. A receiver as in claim 1 wherein the second predetermined number is 11.

10. A receiver as in claim 1 implemented as an integrated circuit.

11. A receiver as in claim 10 and further including a coupling transformer providing signals to the sampling means.

12. A receiver as in claim 1 in combination with a transmitter comprising:
    a signal processor for providing a carrier signal phase modulated by a data signal;
    a bandpass filter;
    an amplifier; and
    a transformer for coupling amplified phase modulated signals to a transmission path.

13. The process of demodulating carrier signals phase modulated by original data signals and transmitted according to an agreed format, comprising the steps of:
    providing an n-phase clock generator producing n clock signals offset by 360°/2n;
    providing n receiver channels each driven by a respective clock signal; and
    sampling the transmission once in each clock signal period;
    finding the majority value of an odd number of samples as a bin value;
    finding the moving average of bin values;
    counting the number of consecutive bin values between changes in bin values to obtain a cluster count;
    applying pattern recognition algorithms to the cluster counts to reconstruct the original data signals.

* * * * *